(12) United States Patent
Fuchs

(10) Patent No.: US 10,478,907 B2
(45) Date of Patent: Nov. 19, 2019

(54) CIRCULAR SAW BENCH INCLUDING A WORK PIECE FEEDING APPARATUS

(75) Inventor: Rudolf Fuchs, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 1114 days.

(21) Appl. No.: 13/054,300

(22) PCT Filed: Jul. 3, 2009

(86) PCT No.: PCT/EP2009/058385
§ 371 (c)(1),
(2), (4) Date: Feb. 14, 2011

(87) PCT Pub. No.: WO2010/006931
PCT Pub. Date: Jan. 21, 2010

(65) Prior Publication Data
US 2011/0146468 A1   Jun. 23, 2011

(30) Foreign Application Priority Data

Jul. 16, 2008   (DE) .................. 10 2008 040 465

(51) Int. Cl.
*B23D 47/04*   (2006.01)
*B26D 7/06*    (2006.01)
(Continued)

(52) U.S. Cl.
CPC ......... *B23D 47/045* (2013.01); *B26D 7/0608* (2013.01); *B26D 7/0616* (2013.01);
(Continued)

(58) Field of Classification Search
CPC ....... B23D 47/045; B27B 25/10; B27B 5/222; B26D 7/0608; B26D 7/0616; Y10T 83/654; Y10T 83/6608; Y10T 83/6609; Y10T 83/6611; Y10T 83/6612; Y10T 83/6614; Y10T 83/6616; Y10T 83/6617; Y10T 83/6619; Y10T 83/662; Y10T 83/7493; Y10T 83/773
(Continued)

(56) References Cited

U.S. PATENT DOCUMENTS

| 703,946 | A | * | 7/1902 | Morgan | .................. | B27B 25/10 |
| | | | | | | 83/409 |
| 707,641 | A | * | 8/1902 | Rostochil | ................ | B27B 25/10 |
| | | | | | | 83/409 |

(Continued)

FOREIGN PATENT DOCUMENTS

| DE | 544 013 | * | 2/1932 | ............ | B27B 25/10 |
| DE | 43 20 654 A1 | * | 1/1995 | ............ | B27B 5/222 |
| FR | 2 342 138 | * | 9/1977 | ............ | B27B 25/10 |

OTHER PUBLICATIONS

Machine translation of DE 43 20 654 from Espacenet website.*

*Primary Examiner* — Clark F Dexter
(74) *Attorney, Agent, or Firm* — Maginot, Moore & Beck LLP

(57) ABSTRACT

The invention relates to a machine-tool, especially a circular saw bench. The machine-tool has a clamping device that can be moved with the work piece in an advancing direction and which is guided at a certain height in relation to the workbench. The clamping device is used to support the work piece, in a carrying manner, in the region of the clamping device, in relation to the workbench.

9 Claims, 4 Drawing Sheets

(51) Int. Cl.
*B27B 5/22* (2006.01)
*B27B 25/10* (2006.01)

(52) U.S. Cl.
CPC .............. *B27B 5/222* (2013.01); *B27B 25/10* (2013.01); *Y10T 83/6608* (2015.04); *Y10T 83/6614* (2015.04); *Y10T 83/7493* (2015.04); *Y10T 83/773* (2015.04)

(58) Field of Classification Search
USPC .............. 83/435.11–435.19, 409, 477.2, 453
See application file for complete search history.

(56) References Cited

U.S. PATENT DOCUMENTS

| | | | | |
|---|---|---|---|---|
| 2,696,852 A | * | 12/1954 | Dunton | B27B 25/10 144/250.18 |
| 2,759,503 A | * | 8/1956 | Goldschmidt | 83/707 |
| 2,966,177 A | | 12/1960 | Weiskopf | |
| 3,051,204 A | * | 8/1962 | Gaskell | 33/437 |
| 4,295,624 A | * | 10/1981 | Granada | A47B 23/043 248/456 |
| 4,441,394 A | * | 4/1984 | Barsotti | B23D 47/025 83/409 |
| 4,658,686 A | | 4/1987 | Woods | |
| 5,016,508 A | * | 5/1991 | Hallenbeck | B27B 25/10 83/435.13 |
| 5,493,789 A | * | 2/1996 | Duginske | B23D 59/002 33/640 |
| 5,595,102 A | * | 1/1997 | O'Grady | B23D 47/04 83/435.17 |
| 5,823,084 A | * | 10/1998 | Ramey | B27B 29/00 269/228 |
| 5,918,520 A | * | 7/1999 | Whitcomb | B23D 47/025 83/435.11 |
| 6,164,176 A | | 12/2000 | Larsson | |
| 6,775,917 B1 | * | 8/2004 | Campbell | 33/640 |
| 2001/0047706 A1 | * | 12/2001 | Parks et al. | 83/435.12 |
| 2002/0104417 A1 | * | 8/2002 | Chen | 83/435.14 |

* cited by examiner

CIRCULAR SAW BENCH INCLUDING A WORK PIECE FEEDING APPARATUS

CROSS-REFERENCE TO RELATED APPLICATION

This application is a 35 USC 371 application of PCT/EP 2009/058385 filed on Jul. 3, 2009.

BACKGROUND OF THE INVENTION

Field of the Invention

The invention relates to a power tool, in particular a circular table saw.

Description of the Prior Art

Power tools with work tables are known in a wide variety of embodiments, including circular table saws, which are provided with a sliding fence for supporting the work piece. A work piece is placed against the sliding fence, which is guided along a sliding guide extending underneath the plane of the table and moved in the infeed direction toward the working tool, e.g. a circular saw blade.

If the work piece is small, access to the vicinity of the tool is required regardless of whether the sliding fence is being used; if the work piece is large, particularly in comparison to the table surface, then primarily in the end phase when the work piece protrudes beyond the table surface, considerable forces are required to keep the work piece in contact with the table surface and the sliding fence and to prevent the work piece from tilting over the front edge of the table relative to the infeed direction.

In addition, particularly at this point in the work, the user is often called on to perform other tasks such as holding together pieces of the work piece being machined and/or switching off the machine.

To facilitate the maneuvering of large work pieces that overhang the work table, it is known to provide the work table with work piece supports that protrude beyond the edges of the work table. The complexity required for this is significant, involves additional effort with corresponding amounts of set-up time, and runs contrary to the concept of performing work with as few accessories as possible and with the minimum amount of space required.

OBJECT AND SUMMARY OF THE INVENTION

The object of the invention is to improve a power tool of the type mentioned at the beginning with regard to the maneuvering of work pieces, particularly with regard to the maneuvering of work pieces of different sizes, and primarily work pieces that are large and heavy.

By using the sliding guide for a work piece support, which is embodied to carry the work piece and in particular, is embodied in the form of a clamping device, it is possible to fix the vertical position of the work piece relative to the plane of the table and in fact—provided that the work piece is overlapping the table surface—independent of the respective phase of the work being performed. As a result, if no automatic infeed is provided, the user only has to exert infeed forces and is then free to perform other functions, with practically no effect on the passage of the work piece. Because the work piece is supported in a carrying fashion relative to the sliding guide by means of the clamping device, the clamping—in the sense of a fixing of the vertical position of the work piece relative to the plane of the table—also does not require the work piece to be pressed against the plane of the table, which can also be accompanied by considerable fluctuations with regard to the infeed forces, depending on the hold-down forces and on the coefficients of friction between the work piece and the plane of the table, thus making it harder for the user to provide guidance.

The user-independent carrying support by means of the clamping device does not mean that the work piece is or must be carried entirely by means of the clamping device, but merely that the clamping forces required depending on the position of the work piece relative to the table surface, for example in order to prevent the work piece from tilting up from the table surface, are absorbed by the clamping device and, having been absorbed by the clamping device, are supported by the sliding guide. With regard to the sliding guide, however, fluctuations in friction coefficients e.g. between the work piece and the table surface—resin-contaminated work pieces come to mind—need not be a source for concern and may not even be present so that despite certain fluctuations, the user is able to favorably control and in particular calculate the infeed forces.

The carrying support of the work piece by means of the clamping device is preferably achieved in that in the vicinity of the clamping device, the load of the work piece is at least somewhat relieved, preferably is lifted slightly above the height of the plane of the table, which according to the invention, can be implemented in a simple way in that the clamping device is provided with a work piece contacting element that engages the work piece from below, extends through the table surface functioning as a work piece support, and ends at a height close to that of the table surface, thus protruding slightly above the plane of the table.

Structurally, this can be implemented in an advantageous way in that the work piece contacting element of the clamping device is situated so that it overlaps the sliding guide so that when the sliding guide is resting in a channel recess, there is a sufficient amount of structural clearance for the work piece contacting element.

The clamping device can be simply embodied in the form of clamping jaws that are situated opposite each other transverse to the plane of the table and are adjustable with regard to their distance from each other, with the lower clamping jaw constituting the work piece contacting element, whose vertical position relative to the sliding guide can be embodied as stationary and adjustable. In a particularly suitable embodiment, the clamping jaws are combined to form a clamping unit, in particular a clamping unit that has a design similar to that of a screw clamp and can be provided in the form of an attachment, in particular an accessory, which in cooperation with the work piece sliding fence, constitutes a clamping device according to the invention or which is intended to be used as a clamp independently of the clamping device.

Particularly suitable for this are clamps similar to screw clamps whose clamping jaws are connected to each other by means of a clamping shaft and with regard to the provided intended use in the clamping device, at least one of the clamping jaws—in particular the upper clamping jaw—is vertically adjustable relative to the clamping shaft and preferably also can be locked in a vertical position. As in other embodiments of the clamping device, this upper clamping jaw is suitably provided with a clamping screw that grasps the work piece or is provided with a corresponding clamping device that acts on the work piece, preferably by means of a pressing piece or pressing plate.

The scope of the invention also includes anchoring or guiding the clamping jaws directly relative to the work piece sliding fence, more or less as insert pieces of the work piece sliding fence.

The invention also relates to a clamping device for power tools, whose work table has a table surface functioning as a work piece support for the work piece to be held by means of a clamping device, and which is provided with a work piece sliding fence; according to the invention, the work piece sliding fence is part of the clamping device and in reciprocal fashion, the clamping device is likewise part of the work piece sliding fence. In particular, it turns out to be useful if the work piece sliding fence is a support for a clamping unit and such a clamping unit, particularly when embodied in a form similar to that of a screw clamp, can also be used for other clamping purposes independently of the work piece sliding fence.

BRIEF DESCRIPTION OF THE DRAWINGS

The invention will be described in detail below in conjunction with the accompanying drawings, in which.

DESCRIPTION OF THE PREFERRED EMBODIMENTS

Figure 1:
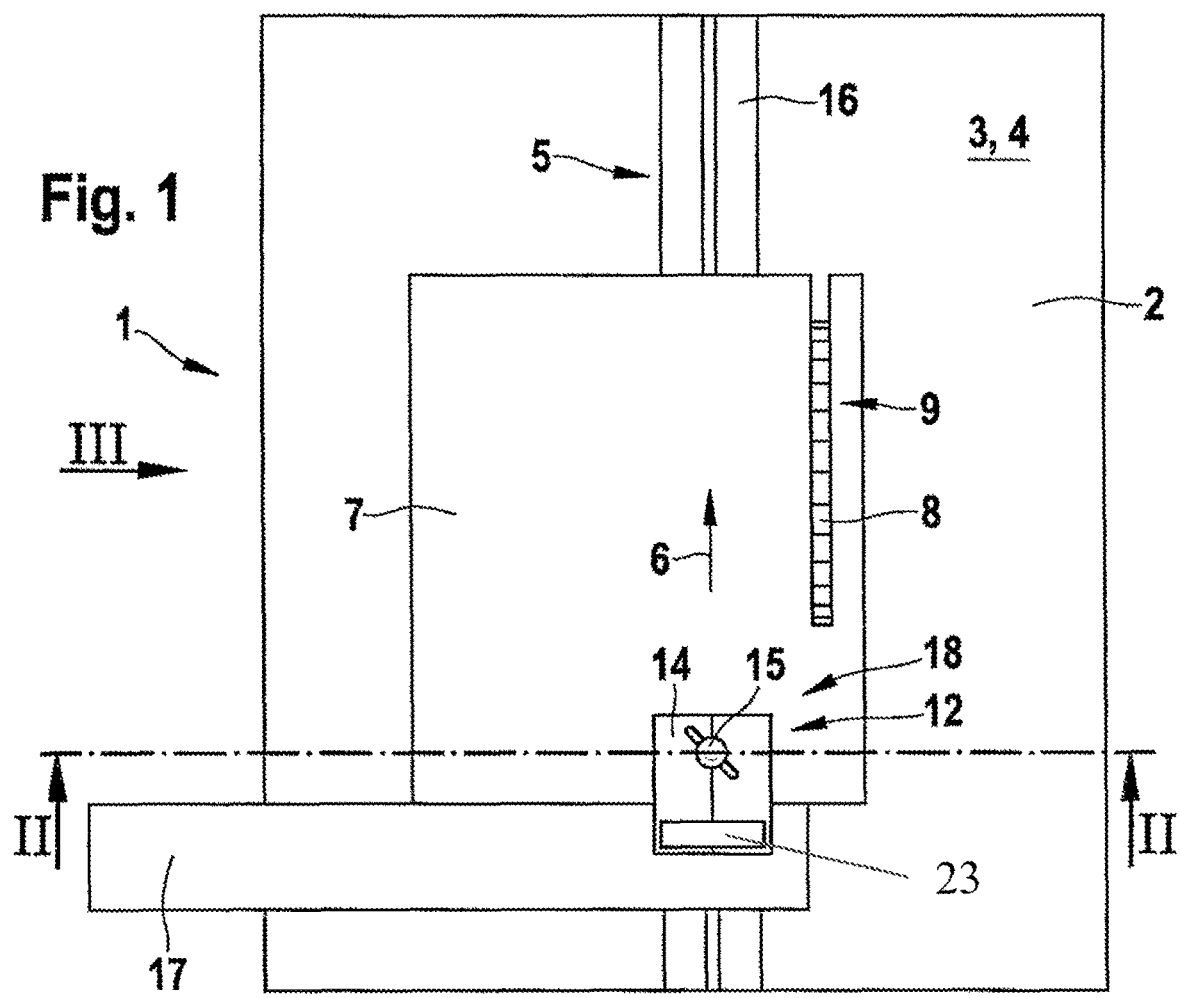
FIG. 1 is a schematic top view of a work table of a power tool embodied in the form of a circular table saw in which the work table, which functions as a support for a work piece is provided with a sliding guide extending in the infeed direction underneath the plane of the table for a work piece support.
Figure 2:
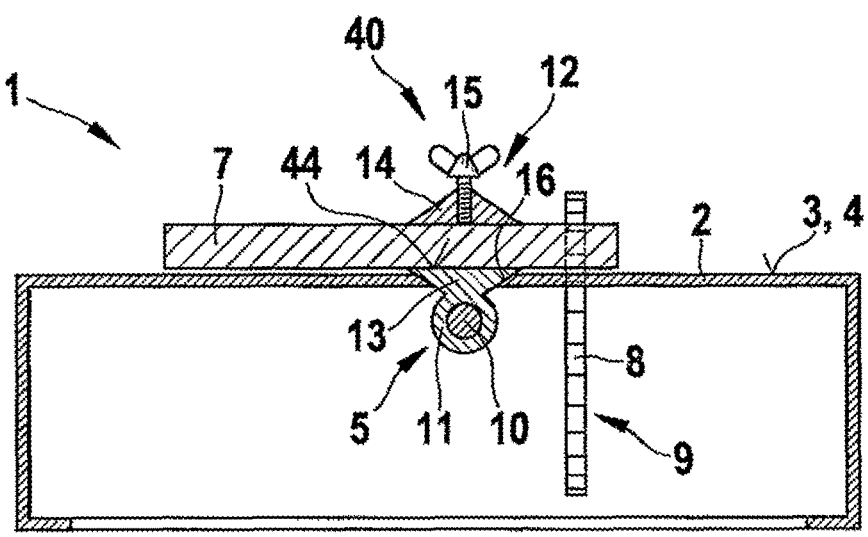
FIG. 2 shows a section along the line II-II in FIG. 1.
Figure 3:
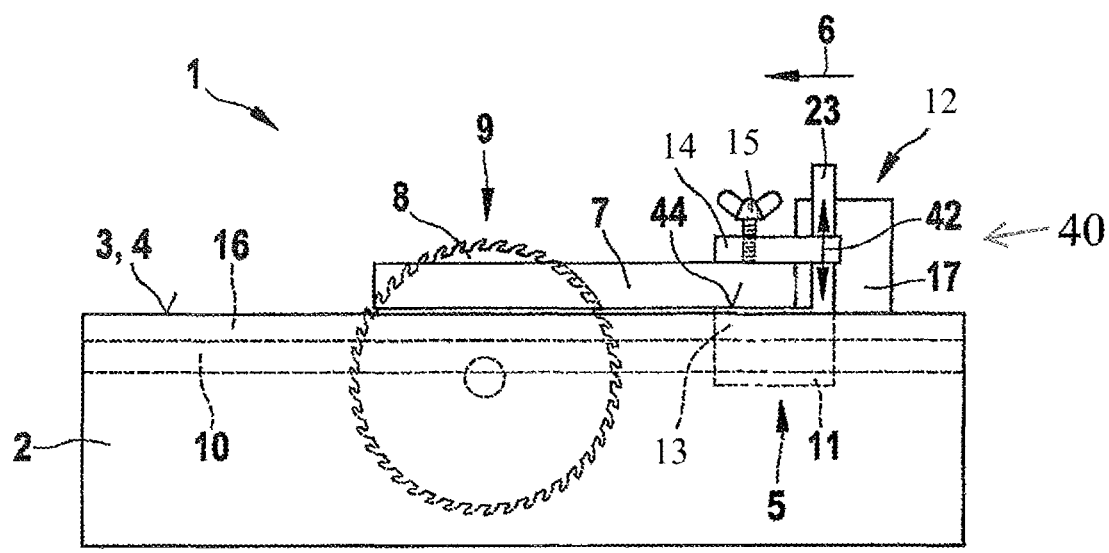
FIG. 3 shows a schematic depiction, viewed in the direction of the arrow III in FIG. 1, in which the work piece is held by means of a clamping device in the vicinity of the work piece support.

FIGS. 1 through 3 show very schematic depictions of a power tool 1 embodied in the form of a circular table saw whose work table 2 has a work piece support 3 constituted by its table surface. A sliding guide 5 is provided beneath the table plane 4 established by the table surface. The sliding guide 5 extends in the infeed direction 6 of a work piece 7 shown in FIGS. 1 and 3, toward the working tool 9 of the power tool 1, which is embodied in the form of a saw blade 8, and as shown in FIGS. 1 and 2, the sliding guide 5 protrudes up from the table plane 4 offset laterally relative to the saw blade 8 and thus has an intersecting region relative to the work piece 7 that can be slid across the work table 2 in the infeed direction 6.

FIG. 2 shows the sliding guide 5 embodied in the form of a guiding rod 10 that is stationary relative to the work table 2 and a guide bushing 11 that is able to slide on this guide rod and is thus embodied in the form of a sliding guide with two degrees of freedom. The scope of the invention, however, also includes embodying the sliding guide 5 for example in the form of a dovetail guide with a guide rail that is stationary relative to the work table, in which a slider with a cross section that tapers toward the top travels so that only a longitudinal sliding is permitted, i.e. one degree of freedom.

The sliding guide 5 fixes the vertical position of a clamping device 12 relative to the work table 2, which clamping device functions as a work piece support 18 in the depiction according to FIG. 1 and is schematically depicted in FIG. 2 in the form of two clamping jaws 13, form of two clamping jaws 13,14, of which the clamping jaw 13 constitutes a lower clamping jaw that engages the work piece 7 from underneath and the clamping jaw 14 constitutes an upper clamping jaw that engages it from above. In a manner that is not shown in FIGS. 1 and 2, the clamping jaws 13 and 14 are embodied so that they can be vertically adjusted relative to each other as indicated by the arrow 42 in FIG. 3 and can be fixed in position relative to each other in a vertical position that is matched to the thickness of the work piece 7; in an advantageous way, as depicted in FIGS. 1 and 2, the upper clamping jaw 14 also has a clamping screw 15 passing through it, which acts on the work piece 7 by means of a clamping plate that is not shown in FIG. 2.

With regard to its association with the table plane 4, the clamping device 12 is embodied so that the work piece 7 being held in the clamping device 12 assumes a predetermined vertical position relative to the table plane 4 in the region of the clamping device 12 and is supported from underneath at least at the height of the table plane 4.

In the vicinity of the clamping device 12 which functions as the work piece support 18, the work piece 7 is consequently supported in a carrying fashion by means of the clamping device 12 without the work piece 7 being pressed against the table surface functioning as a work piece support 3. As shown in FIG. 2, the lower clamping jaw 13, which constitutes the work piece contacting element 44, extends through the work piece support 3, which is constituted by the table surface, through the table channel 16 associated with the sliding guide 5 and is situated with its work piece contacting element 44 protruding slightly from the work piece support 3.

The clamping device 12 consequently ensures that the work piece 7 is fixed in its vertical position in the rear region with regard to the infeed direction 6, regardless of the other support and contact of the work piece 7 against the table surface so that even if the work piece 7 begins to travel in the infeed direction 6 beyond the table surface functioning as the work piece support 3, the work piece 7 is prevented from tilting, without requiring the user to exert a hold-down force on the work piece 7 in opposition to the tilting forces.

It turns out to be particularly advantageous if both the clamping device 12 and a sliding fence 17 are connected to the work table 2 by means of the sliding guide 5; the sliding fence 17 and the clamping device 12 can also be combined to form a work piece support 40. The scope of the invention also extends to an embodiment in which the clamping device 12 which functions as the work piece support 18 is connected to the work table 2 by means of a sliding guide 5 associated with the sliding fence 17 or, in a corresponding way when the clamping device 12 is connected to the sliding guide 5, the work piece 7 is situated on the clamping device 12 in particular on its lower clamping jaw 13 that constitutes the work piece contacting element 44.

In both embodiments, the carrying function of the clamping device 12 is retained and regardless of the fact that the work piece 7 is supported on the lower clamping jaw 13 functioning as a work piece contacting element—with a correspondingly small clamping distance between the work piece 7 and the work piece support 3 embodied in the form of the table surface, the sliding fence 17 can be placed so that it is able to slide relative to the table surface whereby with a rotatory degree of freedom of the sliding guide 5 by means of the sliding fence 17, a corresponding orientation of the sliding fence 17 and the clamping device 12 relative to the work piece support 3 can be achieved without warping.

In the schematic depiction according to FIG. 3, the sliding guide 5 and the table channel 16 are depicted with dashed lines. Also, in a position overlapping that of the table channel 16 and work piece support 3 and connected to the sliding guide 5, there is clamping device 12 by means of which the rear end of the work piece 7 with regard to the infeed direction 6 is held in a carrying fashion. The clamping device 12 is associated with the sliding fence 17 and embodied in the form of a screw clamp 12 equipped with the lower clamping jaw 13 that is stationary relative to the sliding guide 5, the upper clamping jaw 14, and a clamping shaft 23; the upper clamping jaw 14 is able to move relative to the clamping shaft 23 in the longitudinal direction of the shaft and the lower clamping jaw 13 is stationary relative to the clamping shaft so that the clamping shaft 23 and the lower clamping jaw 13 form a support bracket.

The drawing does not show that the upper clamping jaw 14 is preferably to be fixed to the clamping shaft 23 not only by being tilted in a particular vertical position, but preferably, is also to be fixed in various vertical positions by means of a catch mechanism. The tilted clamping of the upper clamping jaw 14 relative to the clamping shaft 23 occurs when the clamping screw 15 comes to rest against the work piece 7; the clamping screw 15 is adjustable relative to the upper clamping jaw 14 and preferably acts on the work piece 7 by means of a clamping plate (not shown) or the like. FIG. 3 also shows that the work piece contacting element constituted by the lower clamping jaw 13 extends through the plane of the table and ends a slight distance above the table surface, which constitutes the table plane 4 and serves as the work piece support 3, but at least ends at the height of the table surface, so that when the work piece 7 is clamped between the clamping jaws 13 and 14, it is at least essentially only clamped relative to these clamping jaws and the sliding guide 5, but is not pressed against the work piece support 3.

Figure 4:
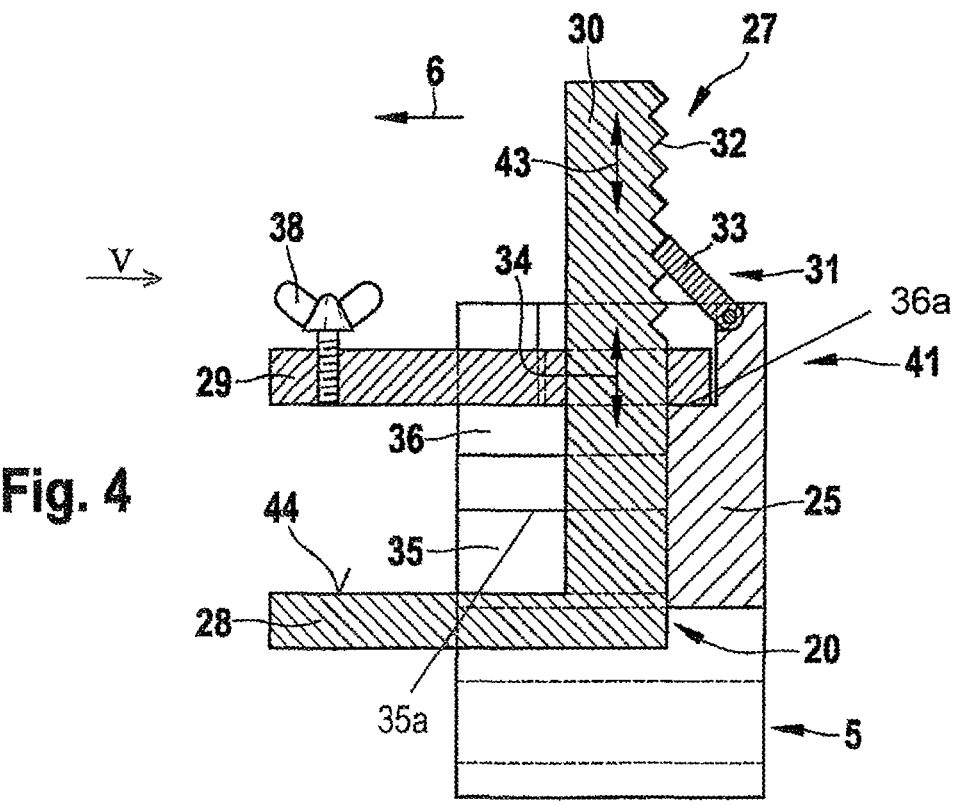
FIG. 4 shows an embodiment of such a clamping device according to the invention in which the clamping device has a clamping unit similar to a screw clamp, which is connected to the work piece sliding fence, in a schematic, sectional depiction along the line IV-IV in FIG. 7.

In order to be able to take into account different situations of the work piece 7, it turns out to be suitable not only if the clamping jaws 13, 14 are adjustable relative to each other, but also if the lower clamping jaw 13 can be adjusted by means of a vertical adjustment, for example by moving the clamping shaft 23 relative to the sliding fence 17 in the vertical direction, i.e. transversely relative to the work piece support 3. It is thus possible—even with work pieces 7 that are unevenly shaped at their rear ends with regard to the infeed direction 6—to ensure a clamping in the vertical direction, which prevents the work piece 7 from tilting when it travels beyond the work piece support 3. When a sliding fence 25 is placed onto the sliding guide 5, this can be achieved, as shown in FIG. 4, by moving the lower clamping jaw 28 and upper clamping jaw 29 of clamping device 27 relative to the sliding fence 25. This can also be achieved, in a manner not shown, in that only a supporting column is stationary relative to the sliding guide 5 and the clamping jaws 28, 29 can be adjusted and fixed in position relative to the supporting column. In addition, the sliding fence 25 can also be guided in a vertically adjustable fashion relative to the supporting column; in an analogous fashion, such a reciprocal adjustability of the clamping jaws 28, 29 and the sliding fence 25 in the vertical direction according to the arrow 43 can also be implemented by virtue of the fact that the sliding fence 25 is vertically adjustable relative to the supporting column and the clamping jaws 28,29 are in turn adjustable relative to the sliding fence 25 in a fashion similar to that in FIGS. 4 through 6.

Figure 5:
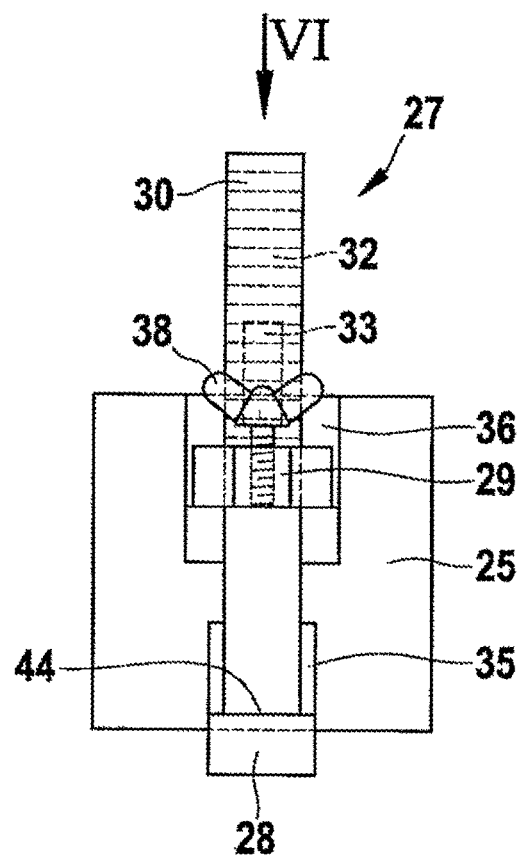
FIG. 5 shows a view in the direction of the arrow V in FIG. 4.
Figure 6:
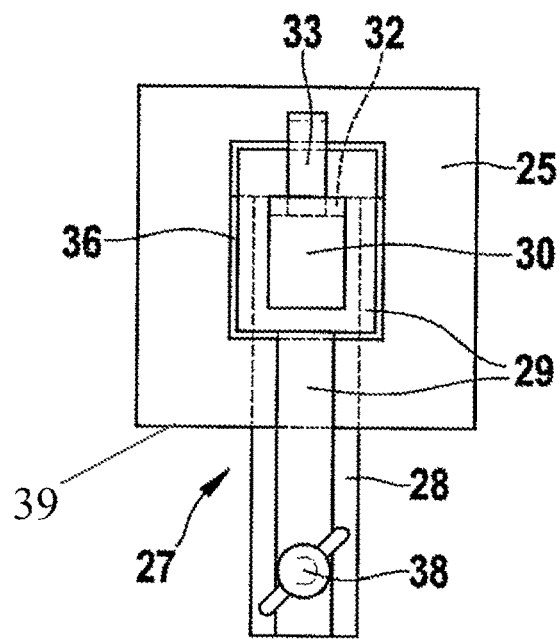
FIG. 6 shows a top view in the direction of the arrow VI in FIG. 5.
Figure 7:
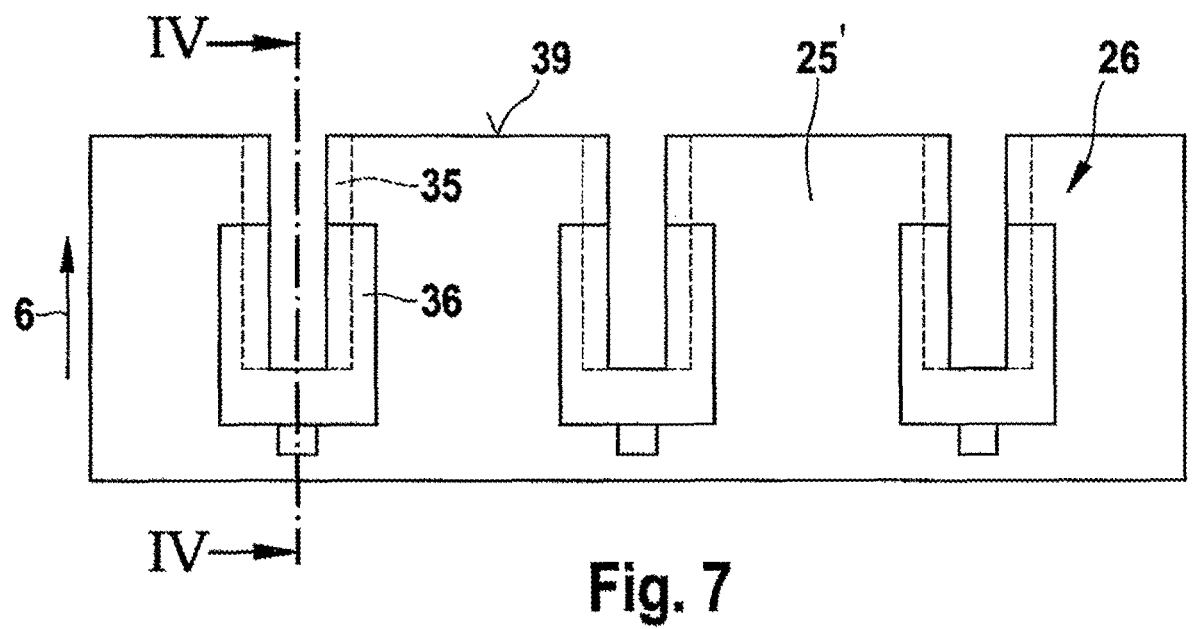
FIG. 7 is a schematic top view of a sliding fence with a plurality of sockets for clamping units according to FIGS. 4 through 6.

Particularly in the combination of the clamping device 27 and sliding fence 25 to form a work piece support 41 serving as a functional unit, it is also possible to provide a sliding fence 25', as shown in FIG. 7, with a plurality of recesses 26 over its length for clamping devices 27, for example of the kind that have been explained in conjunction with FIGS. 4 through 6. The achievable variability that this permits in the arrangement of the clamping devices 27, particularly also in their arrangement relative to a particular work piece 7, results in a particularly user-friendly design; in a suitable fashion, clamping devices 27 are used, which are embodied in the form of screw clamps and can also be used independently of the intended use according to the invention. In particular, it is optionally also possible for conventional clamping devices to be combined with the sliding fence 25 in a manner according to the invention to form a work piece support 41.

FIGS. 4 through 6 show the clamping device 27 of this kind, which is vertically adjustable as a unit relative to the accommodating sliding fence 25 and in addition, its clamping jaws 28 and 29 are adjustable relative to each other; the lower clamping jaw is labeled 28 and the upper clamping jaw is labeled 29. The lower clamping jaw 28 is stationary relative to the clamping shaft 30 and the clamping shaft 30 in turn is vertically adjustable relative to the sliding fence 25 in the direction of the arrow 43. A desired vertical position of the clamping shaft 30 is set by means of a ratchet mechanism 31, indicated by means of a ratchet lever 33 and a saw-toothed profile 32 on the side of the clamping shaft 30.

The upper clamping jaw 29, in turn, is adjustable relative to the clamping shaft 30 in the direction of the arrow 34; desired vertical positions relative to the clamping shaft 30 can also in turn be ensured by means of a catch mechanism that is embodied analogously to the ratchet mechanism 31, but is not shown here.

The clamping jaw 28 is stationary relative to the clamping shaft 30; an appropriate dimensioning of the recesses 35 and 36, and corresponding surfaces 35a and 36a provided in the sliding fence 25 limits the adjusting paths of the clamping jaws 28, 29 relative to the sliding fence 25 in the direction toward the closest possible proximity of the clamping jaws 28, 29 to each other, by bearing on the respective surfaces 35a, 36a. If it is necessary to hold work pieces 7 whose thickness is less than the distance between the recesses 35, 36, then vertical differences in this case can be bridged by means of an indicated clamping screw 38.

Since clamping devices 27 can be used on the side 39 of the sliding fence 25 oriented toward the work piece 7 and since the undercut embodiment of at least one of the recesses 35, 36 toward the side 39 can be used to produce a fixing in position, as shown in the drawings, it is possible to combine the sliding fence 25 and clamping device 27 to produce an entirely satisfactory work piece support 41, regardless of the fact that the clamping devices 27, by virtue of being embodied in the form of screw clamps, can also be used elsewhere, independently of the sliding fence 25.

Figure 8:
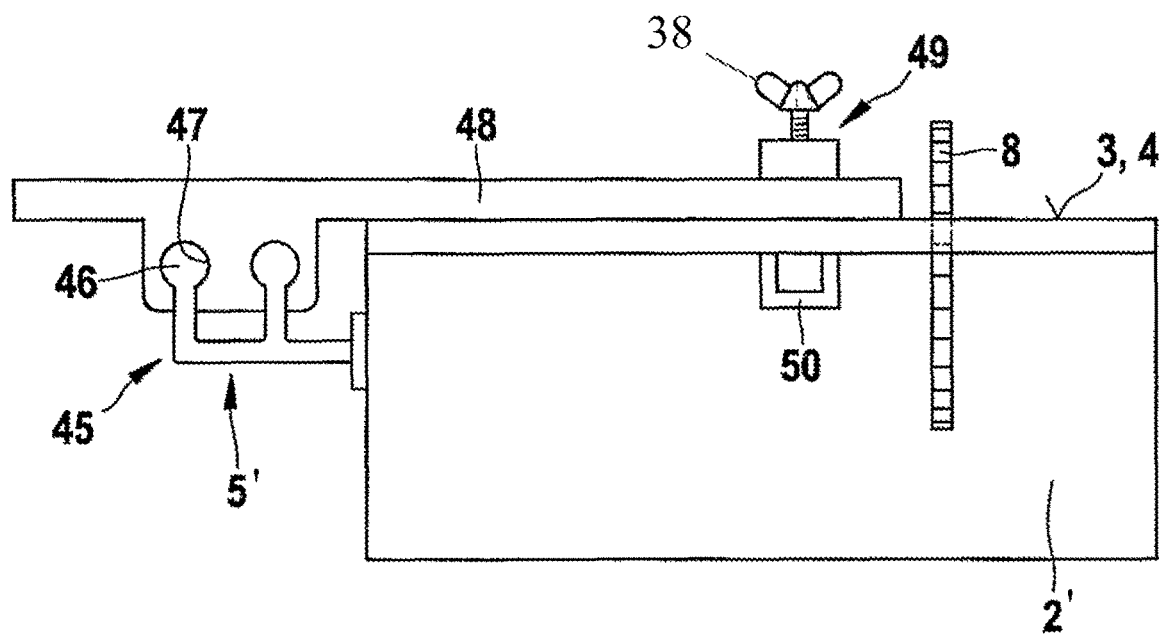
FIG. 8 is a depiction corresponding to the one shown in FIG. 2, with a sliding guide situated laterally outside of the table surface.

In addition, FIG. 8 shows that a sliding guide 5 situated underneath the table plane 4 of the work table 2' can be situated not only in a position overlapping with that of the work piece support 3 composed of the table surface, but can also be situated at the edge of the table surface and in particular, can be situated laterally outside of the table surface. To this end, in FIG. 8, a sliding guide 45 is provided, which protrudes laterally relative to a longitudinal side of the work table 2', extends in both the longitudinal and vertical directions, absorbs torques oriented transversely to it, and includes parallel guide rods 46 and guide bushings 47 that are stationary relative to the sliding fence 48. The sliding fence 48 guided relative to the table 2' in this way, as explained in conjunction with the other exemplary embodiments, can have clamping devices attached to it, schematically indicated here in the form of a clamping device 49. In an analogous fashion, instead of having the sliding fence 48 perform the function of connecting to the sliding guide 45, it is also possible to provide parts of the clamping device 49 in accordance with the embodiments explained above. Corresponding to the clamping device 49, a channel 50 is provided in the table surface functioning as the work piece support 3.

The foregoing relates to the preferred exemplary embodiments of the invention, it being understood that other variants and embodiments thereof are possible within the spirit and scope of the invention, the latter being defined by the appended claims.

The invention claimed is:

1. An apparatus used with a power tool, the power tool having a work table with a work piece support surface for supporting a work piece, the apparatus comprising:
   a guide slidably mounted to the work table to slide in an infeed direction relative to the work piece support surface;
   a work piece support carried by said guide, said work piece support having a clamping device and a work piece sliding fence, said clamping device operatively mounted to said work piece sliding fence in both a clamping position and an unclamping position,
   said clamping device including:
      a lower clamping element having a work piece contacting element and a vertical shaft, said work piece contacting element connected to the vertical shaft for movement therewith and configured and arranged relative to the work piece support surface to be situated at least at a height of the work piece support surface, wherein the lower clamping element is adjustable to adjust a vertical position of said work piece contacting element relative to the work piece support surface of the work table, and
      an upper clamping element slidably supported on the vertical shaft for vertical adjustment relative to the work piece contacting element to press the work piece against the work piece contacting element; and
   said work piece sliding fence arranged relative to the work piece contacting element to contact the work piece when the work piece is clamped against the work piece contacting element and the clamping device is connected to the work piece sliding fence,
   wherein said upper clamping element is arranged in a position overlapping the guide in relation to the work piece support surface.

2. The apparatus as recited in claim 1, wherein the guide includes a sliding guide situated underneath the work piece support surface of the work table.

3. The apparatus as recited in claim 1, wherein the work piece contacting element and the upper clamping element are adjustable relative to the work piece sliding fence.

4. The apparatus as recited in claim 1, wherein the upper clamping element includes a clamping unit embodied in the form of a screw clamp.

5. The apparatus as recited in claim 1, wherein the work piece sliding fence defines a limit stop for limiting the vertical adjustment of the upper clamping element toward the work piece contacting element.

6. An apparatus used with a power tool, the power tool having a work table having a work piece support surface that defines a table plane, the apparatus comprising:
   a guide slidably mounted to the work table to slide in an infeed direction relative to the work piece support surface,
   a work piece support carried by said guide, said work piece support including a clamping device, said clamping device operatively mounted to said guide in both a clamping position and an unclamping position,
   said clamping device including:
      a lower clamping element having a work piece contacting element and a vertical shaft, said work piece contacting element connected to the vertical shaft for movement therewith and configured and arranged relative to the work piece support surface to be situated at least at a height of the work piece support surface, and said vertical shaft carried by said guide, and
      an upper clamping element slidably supported on the vertical shaft for vertical adjustment relative to the work piece contacting element to press a work piece against the contacting element,
   wherein the work piece contacting element is adjustable in its vertical position relative to the table plane and wherein the lower clamping element includes a ratchet mechanism adjustably connecting the lower clamping element to the guide for adjusting the vertical position of the work piece contacting element relative to the guide and relative to the table plane.

7. The apparatus as recited in claim 6, further comprising a work piece sliding fence supported by said guide, wherein the work piece sliding fence defines a limit stop for limiting the vertical adjustment of the work piece contacting element relative to the table plane.

8. The apparatus as recited in claim 7, wherein the said sliding fence defines a second limit stop arranged to limit the vertical adjustment of the upper clamping element.

9. The apparatus as recited in claim 7, wherein:
   the ratchet mechanism includes a saw tooth profile defined in said vertical shaft, and
   said sliding fence includes a ratchet lever mounted thereto for engagement with said saw tooth profile.

\* \* \* \* \*